March 31, 1931.  E. H. LICHTENBERG  1,798,424
AGGREGATE WEIGHING AND MIXING MACHINE
Filed May 16, 1924   3 Sheets-Sheet 1

Witness:
E. H. Wagner.

Inventor
E. H. Lichtenberg
By Robb Robb & Hill
Attorneys

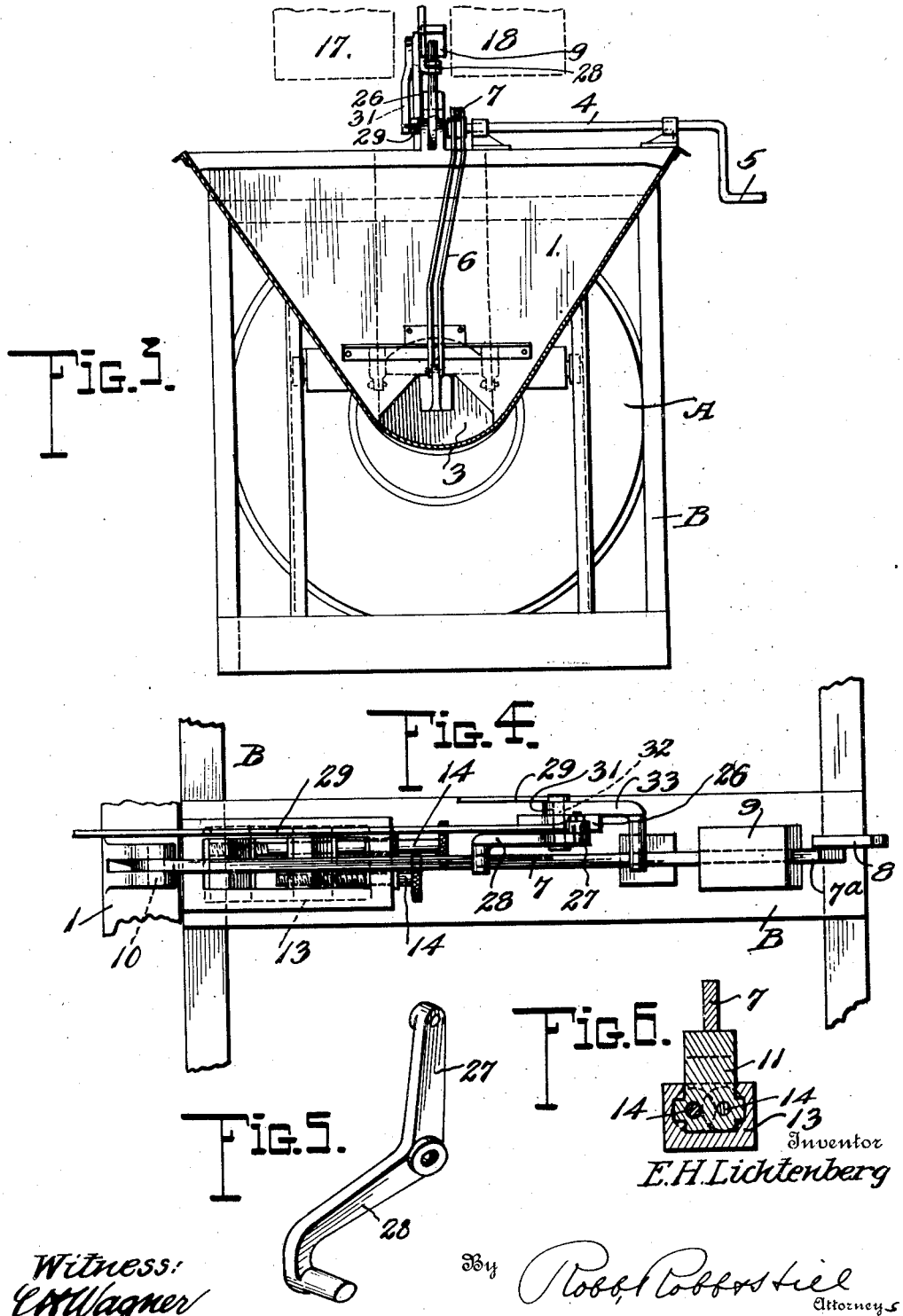

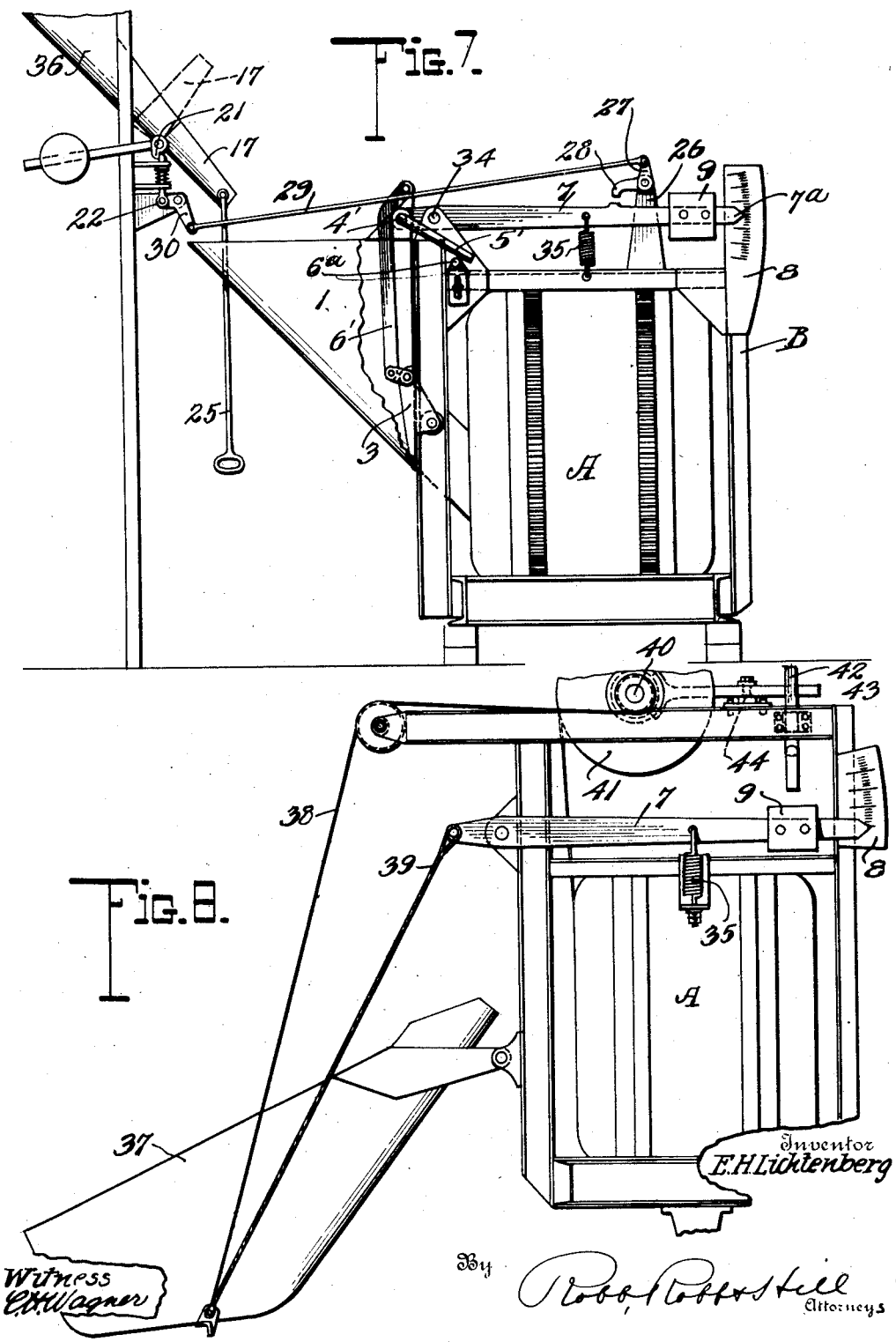

Patented Mar. 31, 1931

1,798,424

UNITED STATES PATENT OFFICE

ERICH H. LICHTENBERG, OF MILWAUKEE, WISCONSIN, ASSIGNOR TO KOEHRING COMPANY, OF MILWAUKEE, WISCONSIN, A CORPORATION

AGGREGATE WEIGHING AND MIXING MACHINE

Application filed May 16, 1924. Serial No. 713,849.

The present advancement in the scientific making of concrete has given rise to the conclusion by those most skilled in this art that the highest degree of uniformity of the ultimate concrete product is obtainable by weighing the different aggregates mixed in the production of the plastic concrete to be used. Weighing is admittedly a much more accurate way of measuring granular material than the employment of volumetric measurements. It is known that a very uniform product of concrete may be produced when the volumetric measures are based upon dry materials. Under practical conditions, however, the aggregates that go to make up the ultimate concrete product are handled under varying conditions of weather, and there are material changes in the moisture content in certain of these aggregates, particularly sand, which cause quite a considerable amount of variation in the volume of this aggregate when measured by the volumetric system. Corrections for moisture content or contents of aggregates may be easily and frequently made by using the weight system, whereas they are almost impossible of accurate determination when the aggregates are measured by volume.

The effect of the moisture variation in the aggregates used is very considerable in measuring the several aggregates, thus a 1:2:3½ mixture of dry materials would require to make concrete 80% dense a 1.42 bbl. of cement per cubic yard. If the sand used should contain 2% of moisture, the cement employed per cubic yard would be 1.506 bbl. according to volume. On the other hand had the materials been weighed in the weight proportion equal to the 1:2:3½ of dry materials, a cement content for the 2% moisture adjustment would be 1.43 bbl. per cubic yard, and even this could be decreased slightly by correcting the weights for the moisture content.

With the foregoing explanation, and the further statement, that the tendency of state high-way commissions now is to adopt the actual weighing of aggregates used for concrete on road pavement construction, my present invention involves a design of concrete mixing machine comprising mechanism for weighing the aggregates that are supplied to the machine, whereby material savings may be made by a contractor in handling the aggregates of different moisture contents, in respect primarily to the amount of cement which he may have to use to obtain a concrete that will comply with specifications prescribing a definite or predetermined density.

With the foregoing in view my invention comprises a combination weighing and mixing machine broadly, for I am not aware that such a machine has yet been produced, wherein the mixing and weighing instrumentalities are co-related in their functioning. By my machine I am enabled to produce concrete of predetermined density by using adjustments of the weights of the aggregates according to the variation in the moisture contents of the same. In this way the product of my machine will be uniform, creating as a consequence a uniformity in the ultimate concrete that is made for said product.

In the carrying out of my invention I utilize a scale beam apparatus together with a batch weighing hopper supplied from one or more aggregate hoppers. As the aggregates are caused to feed to the weighing hopper the scale beam apparatus operates automatically to cut off the supply of a predetermined aggregate when the amount received in the hopper reaches a predetermined weight. The above action is performed automatically and I may utilize in conjunction with the weighing hopper automatic means for causing the aggregates received thereby to flow into the mixer, together with other instrumentalities permitting of certain automatic or manual controls according to requirements of practical conditions of use of my machine.

In the accompanying drawings,

Figure 3 is a vertical sectional view taken through the weighing hopper and showing more particularly the door control passage of the contents thereof to the mixer and manual means to operate said door at will.

Figure 4 is a top plan view showing more particularly the automatic weighing mechanism.

Figure 5 is a detail perspective view of the sand supply hopper door closing trip.

Figure 6 is a detail sectional view showing more clearly the adjustable fulcrum contrivances.

Figure 7 is a view similar to Figure 1 showing a modification wherein a single supply hopper feed is employed leading to the weighing hopper, and Figure 8 is a view similar to Figure 7 but illustrating a loading hopper or skip of the pivoted type as distinguished from the vertically sliding hopper type of the other illustrations previously referred to.

Figure 1:
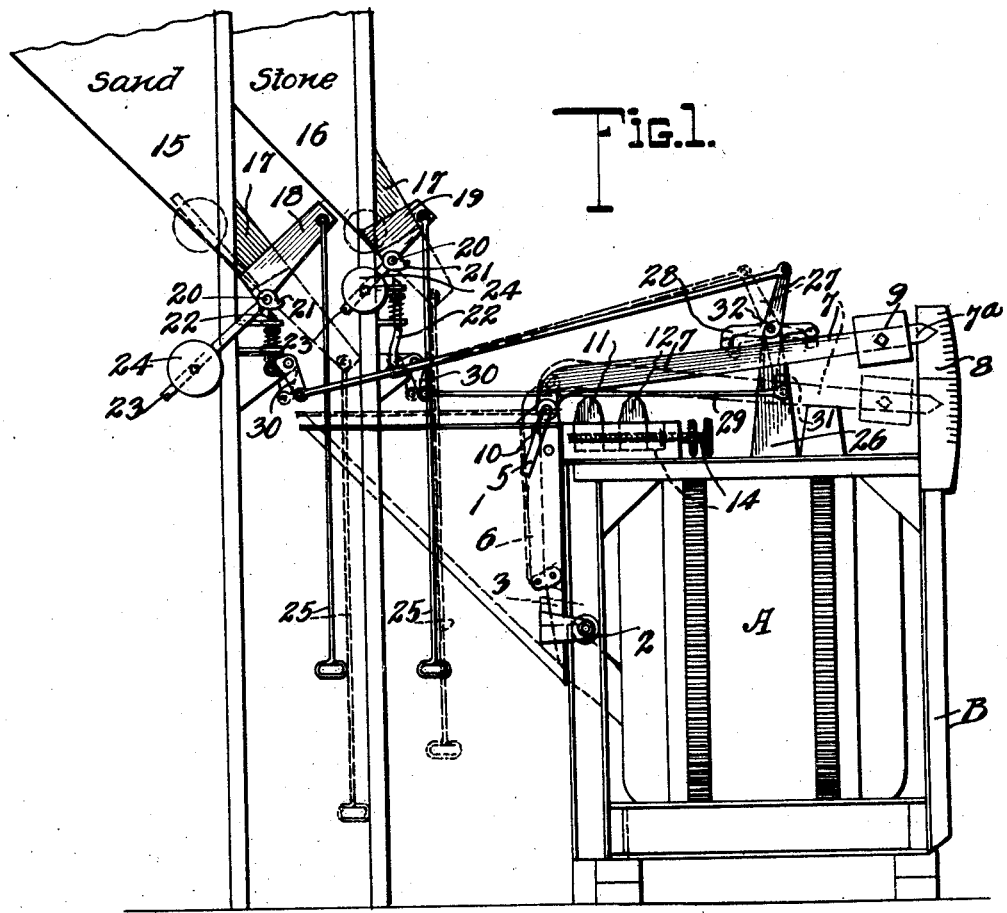
Figure 1 illustrates one of the embodiments which my invention may take wherein a mixer is supplied from two supply hoppers, one for sand and one for stone, and the manual and automatic contrivances above generally used are illustrated.
Figure 2:
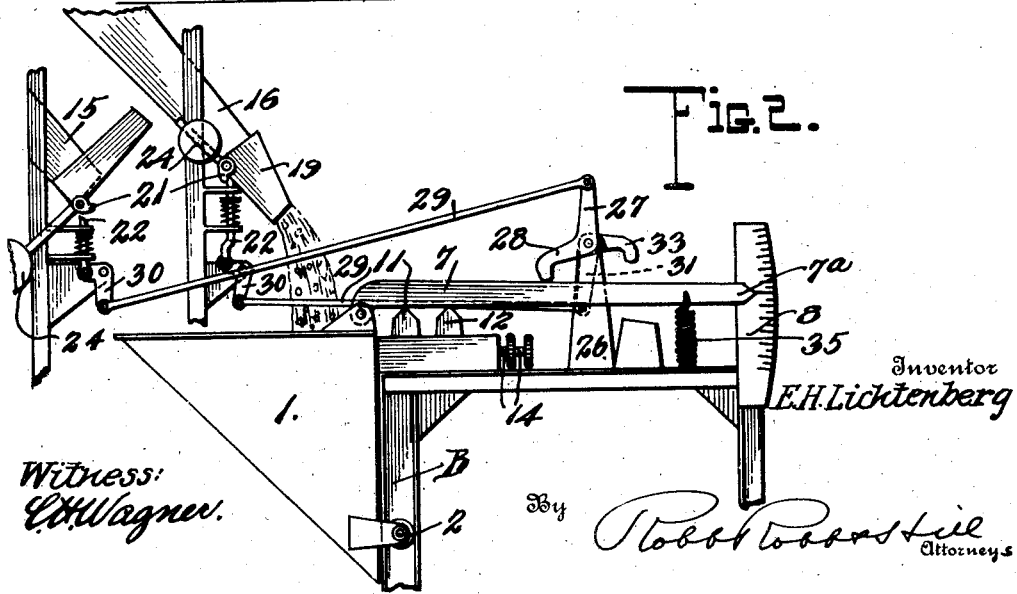
Figure 2 is a view somewhat similar to Figure 1, but more fragmentary, and illustrating the scale beam after it has been operated to shut off the supply of sand which has been weighed, the feed or supply from the stone supply hopper being continued and the remaining to be shut off at a later time in the movement of the weighing hopper.

Describing my invention in its several embodiments more in detail and referring particularly to Figures 1 and 2, the mixer A illustrated may be of a conventional type, portable or non-portable, and is what is known as a Koehring mixer employing a rotary drum. This drum is turned in the usual way by a power plant associated with the machine but not illustrated. A frame-work B supports the mixer or drum A, and at one side of said frame-work is supported what I call the weighing hopper 1. The hopper 1 is adapted to slide vertically on the frame B through the provision of any suitable guiding means including roller guiding devices 2. The hopper 1 is equipped with a door 3 which may be manually opened by a crank shaft 4, see Fig. 3, having the handle 5 and connected to the door 3 by a link 6. Or the door 3 may be opened automatically as an incident to downward movement of the weighing hopper 1 on the frame-work B, at the time when said hopper reaches its lowermost position in what may be termed the weighing operation, this being hereinafter described.

On top of the frame-work B is the weighing apparatus which includes a weighing arm beam or lever 7 which I shall style a scale beam, as it cooperates at one end, as shown at 7ª, with the weighing scale 8 that may be of any desired construction with proper weight graduations. The beam 7 has a weight 9 at its pointer end 7ª, is pivoted at its opposite end at 10 to the upper end of the hopper 1, and is operatively mounted upon the adjustable fulcrums 11 and 12. The fulcrums 11 and 12, as seen in Fig. 6, are mounted in a guide 13, and are independently adjustable in said guide by means of adjusting screws 14, seen best in Fig. 4.

The means for supplying aggregates to the weighing hopper 1 may include the sand supply hopper 15 and the stone supply hopper 16, both equipped with chutes 17 at their lower ends and said chutes comprising the movable sections 18 for the hopper 15 and 19 for the hopper 16. The movable sections 18 and 19 of the chutes 17 are adapted to move downward in alignment with the bodies of the chutes, or move upwards into a right angular position, at which position they form closures for the chutes 17 as quite clearly illustrated in Figure 1. The pivots 20 for the chute sections 18 and 19 are provided with locking dogs 21, adapted to be engaged by spring latches 22 for locking the sections 18 and 19 in their open or feeding positions relatively to the weighing hopper 1. Each of the movable closure sections 18 and 19 is equipped with an arm 23 carrying a heavy weight 24, by which the particular section will be automatically thrown upwards into closing position on release of the dog or catch 21 when the associated latch 22 is disengaged from said dog.

The chute sections 18 and 19 are adapted to be pulled downwards against the action of the weights 24 by handle rods 25.

For the automatic operation of the chute sections 18 and 19, to cause each of them to close when it has fed a quantity of aggregate of a predetermined weight to the weighing hopper, I use the following automatic mechanism.

On a standard 26 carried by the top of the framework B is pivoted a trip lever 27 having a trip arm 28 engageable by the beam 7. The lever 27 is connected by a rod 29 to an angle lever 30 attached to the latch 22 to pull the latter downwards against the action of its normal raising spring. The standard 26 also carries a somewhat similar trip lever 31 extending downwards from the common axis 32 of the levers 31 and 27. The lever 31 has a lateral arm 33 also cooperative with the scale beam 7 to be rocked by the latter, and said lever 31 is mounted by a similar rod 29 to that previously mentioned, and a bell crank 30 like that previously mentioned is attached to the latch 22 associated with the movable chute section 19. The trip lever 27, therefore, controls the chute section 18 and the trip lever 31 controls the chute section 19.

The parts operate substantially as follows: According to the above described features the scale beam 7 is in the dotted line position of Figure 1, the operator pulls downwards on the handle rod 25 connected with the chute section 18 controlling the supply of sand from the supply hopper 15 as it feeds to the weighing hopper 1. The sand is thus fed to the hopper 1 while the scale beam 7 is fulcruming upon the right-hand fulcrum 12 which is adjusted so that when a predetermined weight of sand has been received by the hopper 1, the beam 7 will have been rocked on the fulcrum 12 to trip the lever 27, disengage its control latch 22 from the dog 21 and permit closing of the chute section 18 for the hopper 15. The parts are at this time substantially in the position of Fig. 2, and the scale beam 7 has been rocked so that it is engaged with the left-hand fulcrum 11, and begins to rock upon the latter. At this time the operator having pulled downwards on the chute section 19 causes the stone in the supply hopper 16 to feed to the weighing hopper 1. When a sufficient quantity of the stone has been received by the hopper 1 to reach a predetermined weight, the scale beam 7 will have been rocked to a position by turning on the fulcrum 11, such that it trips the lever 31 and disengages the latch 22, engaging the dog 21 of the movable chute section 19. Thereupon this chute section 19 closes under the action of its weight 24 and the feed of stone from the supply hopper 16 is discontinued. By this time the weighing hopper 1 will have reached its lower limit of movement and its door 3 will open to admit the weighed out quantities of sand and stone to the mixing drum or mixer A which is turning so that the mixing action will commence promptly for efficient operation of the entire machine.

The door 3 as I have stated before may open automatically or it may be opened manually by means which are illustrated in Figure 3.

Figure 7 shows a construction of my machine wherein I utilize a fixed fulcrum or pivot 34 for the scale beam 7 which has a counterbalance weight and is also connected to the frame-work B by a spring 35. In this instance I provide practically the same instrumentalities for automatically closing the chute of the aggregate supply hopper 36 which may be a hopper for sand, gravel, stone or the like. The operation of the parts illustrated in Figure 7 would be self-evident in view of the foregoing.

I have illustrated in Figure 8 a weighing hopper 37, which is in the form of what is known as a side loading skip. This skip is adapted to be raised by an elevating cable 38, and it is normally somewhat elevated from the ground so that it may move downwards as the aggregates are deposited therein. A flexible connector connection 39 attached to the skip 37 is also attached to the scale beam 7, which is mounted somewhat similarly to the arrangement in Figure 7. Obviously, sand may be deposited in the skip 37 and the pointer end of the scale beam 7 will rise until so many pounds of sand are received by the skip, as shown by the scale 8. Then stone or larger aggregates may be deposited in the skip until a certain poundage has been reached therein as will be shown by the scale 8. Likewise the cement may be similarly handled and in this way the weights of the various aggregates may be very accurately determined. I may, of course, associate this pivoted or swinging type of weighing hopper or skip 37 with a sand, stone or other aggregate supply hopper or hoppers, such as shown in Figure 1, and when so doing connect up the beam 7 to trip the movable chute sections of said hopper in quite the same manner as previously described.

I may furthermore provide for the scale beam 7 a control leading to a clutch on the shaft 40 carrying the cable hoisting drum 41 about which the cable 38 is wound to raise the skip. Thus as the scale beam 7 reaches its maximum degree of movement it may strike an operating bar 42 and cam or move into action a clutch lever 43 pivoted about a vertical axis 44. The clutch lever 43 may in this way clutch the shaft 40 which is constantly driven, to the drum 41 thereby causing the drum to be driven and causing the skip 37 to be elevated until it discharges its weighed predetermined quantities of aggregates into the mixer. The movement of the skip or weighing hopper 37 may be discontinued automatically by the use of known clutch knock-out means with which those well versed in this art are acquainted.

It is, of course, to be understood that my invention while primarily a general combination machine involving the mixer, a supply hopper, and intermediate weighing mechanism, is also inclusive of sub-combinations of parts which have utility independently of said broad combination. Thus it is evident that while the weighing hopper is adapted particularly for supplying a mixing machine it might be employed to supply a predetermined quantity of aggregate, by weight, to a different receptacle. Furthermore, the weighing mechanism has utility in conjunction with a mixer or similar receptacle independently of the use of the supply hoppers and the mechanism which controls the opening and closing of the latter for the feeding control of the aggregates to the weighing hopper.

It will be furthermore understood, as hereinbefore premised, that I do not wish to be confined to a construction wherein the hopper 1 is discharged at will by manual operation and I may employ various means for this purpose. As one exemplification of such means, and referring to Figure 7 in this connection, the framework B is provided with an adjustable projection 6a which is adapted to actuate the handle 5' upon the downward movement of the hopper after the aggregates have been weighed, dumped thereinto, and the supply cut off. The actuation of this handle will rotate the crank shaft 4' connected to the door 3 by links 6'. This causes release of the door 3 and dumping of the contents of the hopper 1 into the mixer drum. Thus the hopper is dumped automatically by substantially the same mechanism as employed for the manual control.

Having thus described my invention what I claim as new and desire to secure by Letters Patent is,

1. In a machine of the class described, in combination, a supply hopper, a weighing hopper to receive material from the supply hopper, a support on which said weighing hopper is movably mounted, weighing mechanism connected to the weighing hopper and operable by the movement of the latter on said support, and means to control the feeding action of the material from the supply hopper to the weighing hopper operable by said weighing mechanism, together with a receptacle mounted on said support, and having a feed door controlled by the weighing mechanism through means operably connecting the said door and weighing mechanism.

2. In mechanism of the class described, the combination of a load container, a plurality of sources of supply for the container adapted to supply different materials, weighing mechanism influenced by the load within the container, and means actuated by the weighing mechanism incident to the influence of the load for shutting off the sources of supply in that sequence represented by the predetermined proportions of materials to comprise a given load.

3. In a machine of the class described, in combination, a weighing hopper, a support for said hopper with which it is movably connected, weighing mechanism comprising a scale beam, two fulcrums for said scale beam, means for supplying aggregates to the weighing hopper to cause the scale beam to operate upon one of its fulcrums, and means for supplying other aggregates to the weighing hopper to cause the scale beam to operate upon its other fulcrum.

4. In a machine of the class described, in combination, a weighing hopper, a support for said hopper with which it is movably connected, weighing mechanism comprising a scale beam, two fulcrums for said scale beam, means for supplying aggregates to the weighing hopper to cause the scale beam to operate upon one of its fulcrums, means for supplying other aggregates to the weighing hopper to cause the scale beam to operate upon its other fulcrum, and means for adjusting the said fulcrums to vary the cooperative action of the scale beam and weighing receptacle in relation thereto.

5. In a machine of the class described, in combination, a weighing hopper, a support for said hopper with which it is movably connected, weighing mechanism comprising a scale beam, two fulcrums for said scale beam, means for supplying aggregates to the weighing hopper to cause the scale beam to operate upon one of its fulcrums, means for supplying other aggregates to the weighing hopper to cause the scale beam to operate upon its other fulcrum, trip mechanisms for cutting off the supply of material from each source of supply, and means supporting said trip mechanisms in cooperative relation to the scale beam to be actuated thereby.

6. In mechanism of the class described, the combination of a support, a hopper engaging the support to slide vertically thereon, weighing mechanism carried by the support and resiliently sustaining the hopper, said hopper having a discharge opening, a closure for said opening, means for shifting said closure, means for supplying a load to the hopper, and means actuated by the weighing mechanism incident to the presence of a load in the hopper for shutting off the supply.

7. In a machine of the class described, in combination, a weighing hopper, separate supply hoppers for conducting materials of different kinds to said weighing hopper, weighing mechanism cooperative with the weighing hopper, and means controlled by said weighing mechanism to determine the quantities of materials fed from the supply hoppers to the weighing hopper, and then cut off said supply.

8. In a machine of the class described, in combination, a weighing hopper, separate supply hoppers for supplying different materials to the weighing hopper, weighing mechanism cooperating with the weighing hopper, means for discontinuing the supply of materials from each supply hopper to the weighing hopper when a predetermined quantity of such material has passed to the weighing hopper, and means controlled from the weighing mechanism, common to both the above last mentioned means whereby to determine the time of operation of the said means for discontinuing the supply of materials to the weighing hopper.

9. In combination, a concrete mixing machine of the type comprising a rotary mixing drum, a batch charging hopper arranged to receive and weigh the component materials of a batch and having its discharge in position to feed said materials directly into said drum preliminary to mixing therein, a framework for the machine upon which the batch charging hopper is movably mounted in position to properly supply the aggregates to be mixed directly to the mixing drum as aforesaid, and weighing mechanism with which the batch hopper cooperates so as to be operated by the movement thereof when it receives aggregates to be weighted preliminary to charging.

10. In combination, a concrete mixing machine of the type comprising a rotary mixing drum, a batch charging hopper to receive and discharge separate measured batches of aggregates arranged to directly feed the aggregate materials into said drum preliminary to mixing therein, a framework for the machine upon which the batch charging hopper is movably mounted in position to properly supply the aggregates directly to and to be mixed in the mixing drum, weighing mechanism coacting with the batch hopper so as to be operated by the movement thereof when it receives aggregates to be weighed preliminary to charging, and means associated with the batch hopper for holding the batch aggregates being weighed therein from displacement therefrom during the weighing operation.

11. In combination, a concrete mixing machine of the type comprising a rotary mixing drum, means for supplying the separate constituents of a batch, a batch charging hopper forming a receiver common to said supply means and arranged to feed aggregate materials directly into said drum preliminary to mixing therein, a framework for the machine upon which the batch charging hopper is movably mounted in position to properly supply the aggregates to be mixed to the mixing drum, weighing mechanism connected with the batch hopper so as to be operated by the movement thereof when it receives aggregates to be weighed preliminary to charging, means associated with the batch hopper for retaining the aggregates being weighed therein during the weighing operation, means between the weighing mechanism and the supply means operative to cut off the supply of aggregates to the batch hopper when a predetermined weight of the aggregates is received in the batch hopper, and means for operating the batch retaining means aforesaid when the batch hopper moves under the weight of the aggregates received thereby, whereby the aggregates are caused to automatically flow into the mixing drum in a proper weighed amount when the said batch hopper moves.

12. In combination, a mixing machine comprising a rotary drum having a receiving opening, a batch hopper for receiving and weighing the component materials of a batch and feeding the assembled components directly to the drum to be mixed therein, a framework movably supporting the batch hopper in proper relation to the drum, a closure for the batch hopper preventing the aggregates from entering the drum from the batch hopper until said aggregates reach a predetermined weight and cause the batch hopper to move relatively to its supporting framework, weighing mechanism supporting the batch hopper for a movable weighing action thereof, and instrumentalities which cause the closure to open when the weighing movement takes place to thereby charge the aggregate materials directly into the drum from the hopper.

13. In combination, a concrete mixing machine of the type handling separate successive batches comprising a rotary mixing drum having an end supply opening for aggregates, and a charging hopper in which the materials of a batch are assembled for weighing and mounted so that its discharging end supplies aggregates therein directly to the entrance opening of the drum, means movably supporting the charging hopper for weighing action, a closure adjacent the drum for controlling the passage of the aggregates from the said hopper into the mixing drum, weighing mechanism connected with the hopper and permitting the latter to move and register weight when a predetermined quantity of aggregates is received therein, and instrumentalities whereby upon the said weighing movement of the hopper said closure is opened to permit the aggregates in the hopper to pass directly into the drum.

14. Means as set forth in claim 13 combined with manual control means for the said closure.

15. In combination, a mixing machine of the type comprising a rotary mixing drum having an entrance opening for aggregates, and a batch hopper cooperating with the drum to receive the several materials of a batch of aggregates and to supply the aggregates thereto, means movably supporting the batch hopper in its relation to the drum, weighing mechanisms connected with the batch hopper and movable by the movement of the batch hopper to register weight, together with a closure between the batch hopper and the drum operable so as to permit the contents of the batch hopper to flow into the drum.

16. In combination, a mixing drum, a frame therefor, weighing mechanism mounted on said frame and comprising a beam fulcrumed thereon, a batch hopper supported by one end of said beam for vertical movement in relation to the frame and at one side of the charging opening of said drum, means between the said charging opening and the hopper discharge for retaining the contents of the hopper until weighed, and means coacting with the weighing mechanism for operating the retaining means incident to the weighing operation to effect discharge of the batch materials directly into the drum.

In testimony whereof I affix my signature.

ERICH H. LICHTENBERG.